United States Patent
Ogletree

[19]
[11] Patent Number: 5,978,895
[45] Date of Patent: Nov. 2, 1999

[54] METHOD FOR SPEEDING MATHEMATICAL OPERATIONS IN A PROCESSOR CORE

[75] Inventor: Thomas M. Ogletree, Austin, Tex.

[73] Assignee: Cirrus Logic, Inc., Fremont, Calif.

[21] Appl. No.: 08/832,789

[22] Filed: Apr. 4, 1997

[51] Int. Cl.[6] .............................. G06F 9/34; G06F 9/35
[52] U.S. Cl. ........................................ 711/220; 711/214
[58] Field of Search .................................. 711/214, 219, 711/220; 395/384

[56] References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,761,740 | 6/1998 | Johnson et al. | 711/202 |

FOREIGN PATENT DOCUMENTS 9636011   11/1996   WIPO .

*Primary Examiner*—Jack A. Lane
*Attorney, Agent, or Firm*—Conley, Rose & Tayon; Steven A. Shaw

[57] ABSTRACT

Method and apparatus are disclosed for increasing the speed of mathematical operations in a processor core. The invention increases the speed of mathematical operations by delivering a first instruction indicating the total number of clock cycles a sequence of operations will occupy. On a first subsequent cycle, a different instruction is provided including operand addresses. Other instructions containing operand addresses may be provided on subsequent cycles. Alternatively, an internal pointer may be dynamically changed each cycle to provide new operand addresses. The operands are then retrieved and operated on while other operands are generated.

18 Claims, 4 Drawing Sheets

MOVBP Instruction

General Operation Instruction

| opcode | operand address | operand address | Destination address |
|---|---|---|---|
| 31   27 | 26           18 | 17          9 | 8          0 |

METHOD FOR SPEEDING MATHEMATICAL OPERATIONS IN A PROCESSOR CORE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to computer architecture and methods for increasing the speed at which mathematical operations are performed in a processor. More particularly, the present invention relates to a dedicated computer architecture and related method for dynamically updating operand addresses during execution of mathematical operations to improve the speed of executing mathematical operations in a processor.

2. Description of the Related Art

The advent of the electronic computer in the United States came in response to the U.S. Army's needs in World War II. The Army needed to quickly compute range tables for its heavy artillery and so it began researching ways to speed its computations. This led to the construction of the ENIAC computer in 1946, too late to be of help to the Allies in World War II, but ushering in the infancy of computers in the United States. Since then, many breakthroughs in computer speed and power have been achieved, permitting the amount and complexity of information processed by computers to greatly increase. Despite these great advances, presently there is an acute need to process even greater quantities of data at still higher speeds.

For example, one modem application that is particularly data intensive is computer graphics. The processing of still images or video consumes prodigious amounts of storage space within the computer. Lossy image compression techniques often are used in an attempt to reduce the amount of storage required by eliminating unnecessary features or portions of the image. Part of the lossy image compression technique involves selecting the portions of the image that can be eliminated without causing a perceptible difference in image quality. Determining the portions to eliminate typically is accomplished by transforming the image into its mathematical equivalent. Once the image is transformed in this fashion, high frequency components are deleted based upon the concept that deletion of high frequency coefficients affect the appearance of an image significantly less than the deletion of low frequency coefficients.

Modern-day image compression relies on a transform function known as the discrete cosine transform (DCT) to eliminate portions of the image. The DCT compression is used in techniques such as JPEG (Joint Photographic Experts Group) and MPEG (Motion Picture Experts Group) to eliminate unnecessary aspects of images. The DCT compression also is used in picture phone transmission and has been proposed in high definition television standards. However, the main drawback of using the DCT for image compression instead of techniques such as the DFT (Discrete Fourier Transform) is the amount of required arithmetic. Although fewer DCT coefficients are required than are required in a corresponding DFT implementation, the DCT technique requires far more mathematical operations to execute than does the DFT technique. Thus, the additional mathematical operations required by the technique effectively slow compression and decompression of an image from its spatial representation to its mathematical equivalent and vice versa. Image compression is just one critical example of a mathematically intensive graphics operation. Mathematically intensive operations are present in other signal processing techniques as well as in other fields.

Mathematical operations typically require a relatively large amount of system resources to process. For instance, the multiplication of two matrices to yield a single, final matrix involves multiplying each element of row 1 of the first matrix times each element of column 1 of the second matrix. The addition of these multiplied numbers yields a single number corresponding to row 1, column 1 of the final matrix. In an eight-by-eight matrix, this sequence must be repeated sixty-four times.

Further, each multiplication executed by a computer involves multiple steps. First, two multiplicands must be retrieved from memory. If each multiplicand were located at the address supplied by a program or register, this would occupy one cycle per multiplicand. This storage scheme is commonly referred to as direct addressing. If, instead, indirect addressing were utilized, one or more additional steps per operand would be required. In indirect or multi-level addressing, the address supplied by a program or register is that of a storage location containing a second address, with the second address identifying the ultimate location of the desired data. Alternately, the second address may be the first field of a chained list of address files, the last of which identifies the ultimate location of the desired multiplicand.

Thus, in indirect addressing the memory location corresponding to the address provided by a computer program would merely contain another address, often referred to as the effective address. The effective address is the address identifying an address where the desired operand is contained. When indirect addressing is implemented, retrieving each operand takes at least two steps which corresponds to two or more clock cycles of computer time. Despite the overhead associated with indirect addressing, it is prevalent today, especially in RISC (Reduced Instruction Set Computing) architectures because it provides a degree of flexibility not available with direct addressing. For instance, indirect addressing facilitates sharing of data between several users or several programs where the user does not know the exact address of the shared information during program assembly.

In any case, once the multiplicands have been retrieved, they must be multiplied and stored in an accumulator. The result may be immediately written to a destination address for final storage, in which case one more address needs to be supplied for the accumulator address. In the case of a matrix multiply, this multiplication and storage process is repeated until the matrix multiplication process is complete. Matrix multiplication, therefore, obviously requires a large number of clock cycles for the various operations to be performed. Thus, applications such as computer graphics data compression using the DCT compression technique are slow and unwieldy. Further, while the processor is retrieving, multiplying, and storing, it is precluded from other activities, thereby limiting system performance.

The above matrix multiplication example is not the only mathematical operation that affects computer performance. Even simpler operations such as multiple adds can take prodigious amounts of computer time, if enough additions are involved. Each addition operation involves retrieving two operands from memory and sending them to an adder. Subsequently, the sum must be stored in a register or memory. At one cycle per instruction, the processor time dedicated to adding operands becomes substantial.

The computer industry recognized that mathematical operations are a drag on system performance and has had some success in increasing the speed of mathematical operations executed by a processor. As is well known, the broad idea of pipelining information has been explored. Pipelining is the term used when hardware is built from several functional units placed in a sequential order. Doing work in parallel is also known to speed the execution of mathematical operations when the work can be divided. Executing operations in parallel refers to dividing work into several independent or near-independent units and executing or solving them simultaneously, usually with different processors. Even though these techniques are known and have been used, mathematical operations still are executed relatively slowly.

Therefore, a need exists for a technique to speed the execution of mathematical operations in a computer. Preferably, such a method would not depend on whether direct or indirect addressing was employed in the processor, but would serve to provide a performance boost in either situation. The ideal method or device also would be flexible in that it would not be limited to one type of mathematical function, but also could quickly execute other functions or operands, at approximately the same speed.

SUMMARY OF THE INVENTION

The preferred embodiment of the present invention is a dedicated computer architecture comprising an instruction decoder, a first and a second base pointer, each base pointer corresponding to a desired operand address, a pair of read ports, a write port, a register file connected to the read and write ports, and two adders. These components connect to an arithmetic logic unit (ALU) that includes an accumulator. A central processor provides a pair of input addresses corresponding to two operands to the instruction decoder of the preferred embodiment, along with a data string providing information on a desired mathematical operation and a destination address for storing the result of the operation. Subsequently, a value stored in the first base pointer is added to one of the input addresses to yield a first actual address and a value stored in the second base pointer is added to the other input address to yield a second actual address. Two operands are then retrieved from the register file at locations corresponding to the two actual addresses. Assuming the mathematical operation is a multiplication, the values held in each base pointer block are incremented some predetermined integer value. The retrieved operands are then multiplied and stored in the accumulator while two new operands are retrieved from the register file based on the new values held in the base pointer blocks. Simultaneously, the values held in the base pointers are once again incremented. This sequence continues until all the desired operands have been multiplied. Although the above example demonstrates a multiplication operation, the present invention may employ any type of mathematical function. The preferred embodiment expedites the execution of mathematical operations regardless of whether direct or indirect addressing is employed in the processor and is about equally fast at both. For a large number of operands, the system approaches an average of one executed operation per cycle.

The present invention also comprises a method and a corresponding device for speeding mathematical operations.

In particular, a first instruction including two increment values and a count value is provided to an instruction decoder. This first instruction also includes two values called the first and second offset values. The first increment and first offset values are sent to a first base pointer, where they are stored. The second increment and second offset values are correspondingly sent to a second base pointer, where they are stored. The count value is sent to and stored at both base pointers. Subsequently, the instruction decoder receives an operation instruction including two operand addresses and a mathematical operation such as add or multiply. The first operand address is added to the first offset value held in the first base pointer. The second operand address is added to the second offset value held in the second base pointer. Both sums are supplied to a read port. The read port retrieves the operand values corresponding to each sum and provides them to an arithmetic logic unit. The base pointers each increment their respective offset value according to the respective increment value stored in that base pointer. Thus, the base pointers thereby provide modified outputs. These modified outputs therefore change the operand addresses delivered to the read port, since the read port is supplied with address values equal to the sum of one of the offset values held in the base pointers and one of the operand addresses contained in the operation instruction. Alternately, a subsequent operation instruction including two new operand addresses and a new mathematical operation may be supplied to the instruction decoder. Either way, the read port receives two new operand addresses. The read port retrieves these two new operands and supplies them to the arithmetic logic unit. This sequence is repeated until all the relevant operands have been combined at which time the value in the ALU is stored to a destination address and the registers are cleared.

The present invention substantially speeds repetitive mathematical operations such as those used in data decompression, matrix multiplies, and multiple adds. By using pipelining, hardware implementation, and a novel architecture, many of the shortcomings of the prior art are solved by the present invention.

BRIEF DESCRIPTION OF THE DRAWINGS

For a more detailed description of the preferred embodiment of the present invention, reference will now be made to the accompanying drawings, wherein.

Appendix 1 is software code reflecting a software implementation of the present invention.

DETAILED DESCRIPTION OF THE PREFERRED EMBODIMENT

Figure 1:
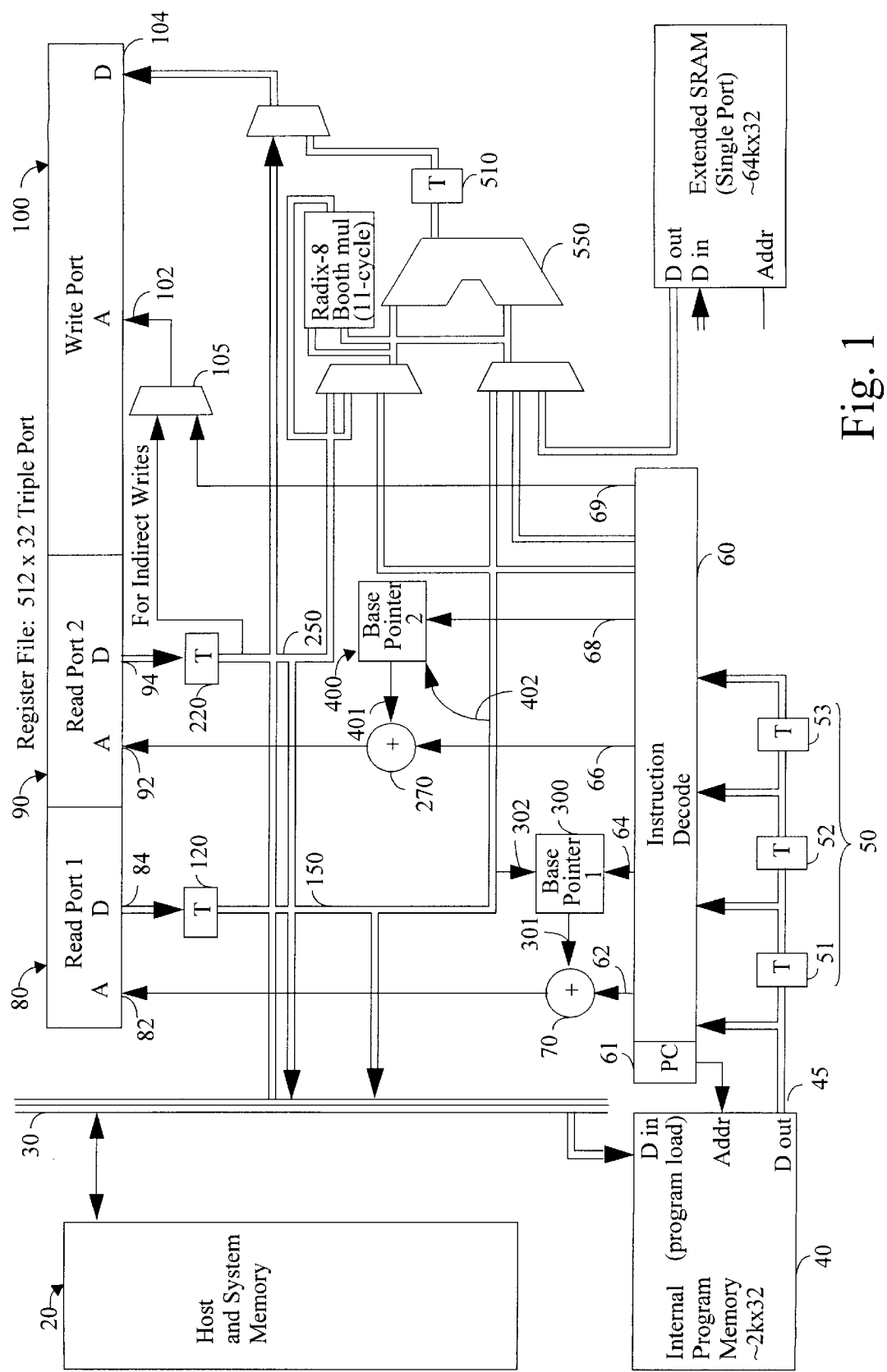
FIG. 1 is a schematic in block format of the computer architecture of the preferred embodiment.

Referring now to FIG. 1, the computer system constructed in accordance with the preferred embodiment generally includes host and system memory 20, data bus 30, internal program memory 40 coupled to the data bus 30, a first set of registers or latches (shown generally at 50), and an instruction decoder 60. Other system components commonly found in computer systems have been omitted in order to highlight the patentable aspects of the present invention.

Referring still to FIG. 1, host and system memory 20 preferably comprises a random access memory (RAM) to store data being processed and functions as the working memory of the processing unit. The host and system memory 20 couples to other system components via data bus 30. The data bus 30 preferably comprises a host data bus, and thus preferably is 32 bits wide. The host data bus 30 carries address and control signals in addition to data throughout the computer system.

The internal program memory 40 also preferably couples to the host data bus 30. The internal program memory preferably comprises a read only memory (ROM) device, such as an EEPROM (electronically erasable programmable read only memory). The internal program memory 40 preferably drives data and instructions to a first set of latches 50 and instruction decoder 60 via a local bus 45 during read cycles. First set of latches 50 includes latch or register 51, register 52, and register 53. Set of latches 50 store data from local bus 45 in its first register 51. During subsequent clock cycles, data stored in the first register 51 cascades down to registers 52 and 53. Thus, the first set of registers 50 operates as a pipeline so that the information loaded into the instruction decoder 60 on a first clock cycle is also present in set of latches 50 during later cycles. If desired, more registers may be added to set of latches 50 to lengthen the pipeline in the event the information loaded into the instruction decoder 60 must be preserved for additional cycles.

The instruction decoder 60 operates to receive and decode instructions obtained from programmable memory 40. After the instructions have been decoded, instruction decoder 60 drives out data on output lines 62, 64, 66, 68, and 69. The instruction decoder 60 also may include a storage device for storing a destination address and function codes, as explained below. In addition, instruction decoder 60 preferably includes control circuitry (not explicitly shown) to control timing.

Still referring to FIG. 1, the output lines 62, 64, 66, 68, 69 of the instruction decoder 60 deliver data to read ports 80 and 90, write port 100, base pointers 300 and 400, and loop-back circuitry 500. More specifically, output line 62 of instruction decoder 60 connects electrically to input terminal 82 of read port1 80 through a digital logic adder 70. Similarly, output line 66 connects via digital logic adder 270 to input terminal 92 of read port2 90. Output line 69 connects to write port 100 through a multiplexer (MUX) 105. Output lines 64 and 68, which are each preferably 15 bits wide, connect as inputs to base pointers 300 and 400, respectively. Base pointer 300 (BP1) connects to an output line 301 to transmit a base pointer value to adder 70. Likewise, base pointer 400 (BP2) connects to an output line 401 to transmit its own base pointer value to adder 270. Once an address has been electrically provided by instruction decoder 60 through output line 62, digital logic adder 70 adds the address value on instruction decoder output line 62 and the value on BP1 output line 301. Adder 70 then provides the sum of these two values to the input terminal 82 of read port1 80. Adder 270 operates in a corresponding manner to provide a sum to the input terminal 92 of read port2 90 by adding the address value on instruction decoder output line 68 and the value on BP2 output line 401

Figure 2:
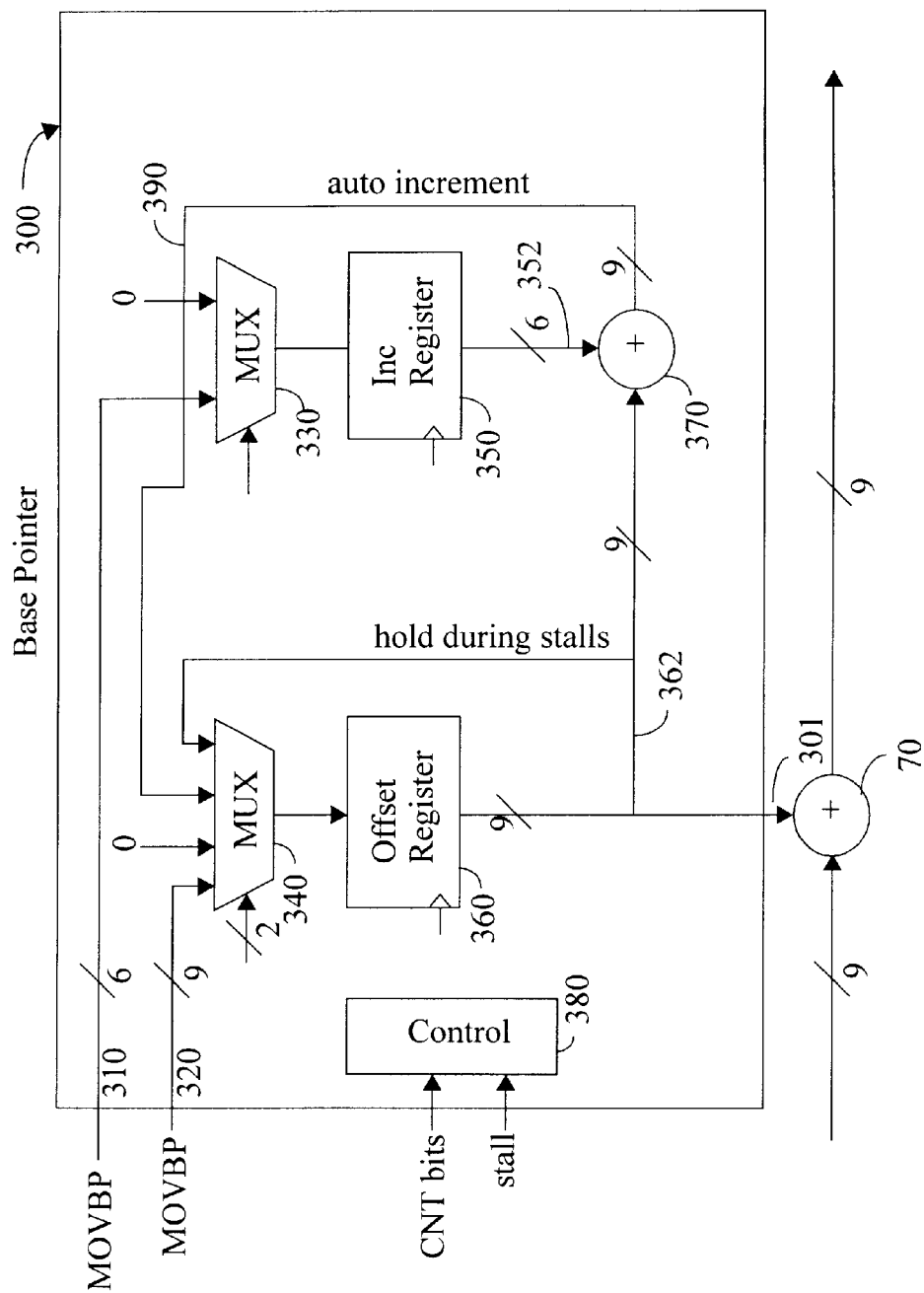
FIG. 2 is a schematic of the computer architecture of the base pointer block of FIG. 1.

Referring now to FIG. 2, BP1 300 will now be described in more detail. As explained above, it should be understood that other than the origin of its input signals and the destination of its output signals, base pointer 400 (BP2) is configured and operates in an identical manner to BP1 300. As shown in FIG. 2, BP1 includes an input bus 310, an input bus 320, multiplexers 330 and 340, an increment register 350, an offset register 360, and a digital logic adder 370. BP1 300 also includes control logic 380, which orchestrates the operation of the multiplexers and registers. In addition, BP1 connects to output line 301.

Input bus 310 preferably includes six data lines that connect to multiplexer 330, while input bus 320 preferably includes nine data lines that connect to multiplexer 340. Increment register 350 connects to the output terminal of multiplexer 330 and is configured to load a six-bit value corresponding to the value present on the input bus 310. Offset register 360 connects to the output terminal of multiplexer 340 and is configured to load a nine-bit value corresponding to the value present on input bus 320. The nine-bit value stored in offset register 360 appears on output line 301 of BP1 300. In addition, the output from offset register 360 is provided to digital logic adder 370 together with the output of increment register 350. Digital logic adder 370 provides its sum to multiplexer 340 via line 390. Control logic 380 enables multiplexers 330 and 340 and clears registers 350 and 360 when appropriate. Control logic 380 also decrements and stores the value of a count field (CNT) as explained below.

Referring again to FIG. 1, the read ports 80 and 90 preferably deliver output signals on output terminals 84 and 94, respectively. Output terminal 84 of read port1 80 supplies data to latch 120 while output terminal 94 of read port2 90 supplies data to latch 220. Latches 120 and 220 each connect to respective output lines 150 and 250. Output line 150 electrically connects to BP1 300 as lines 302 and 402, respectively. Line 302 delivers the data carried on both input line 310 and input line 320 and is therefore preferably fifteen bits wide. Correspondingly, line 402 connects as the inputs to BP2 400 and also is preferably 15 bits wide. In addition, output 150, as well as output 250, enter into ALU 550. Output 150 and output 250 are each preferably 32 bits wide. ALU 550 operates upon the operands presented to its inputs and contains an accumulate register 510 for storing the results. Latches 120 and 220 stabilize the data supplied by the output terminals 84 of read port1 80 and 94 of read port2 90. In operation, data appearing at output terminals 84 and 94 are stabilized by latches 120 and 220 and then appear one clock cycle later at lines 150 and 250, respectively.

Figure 3:
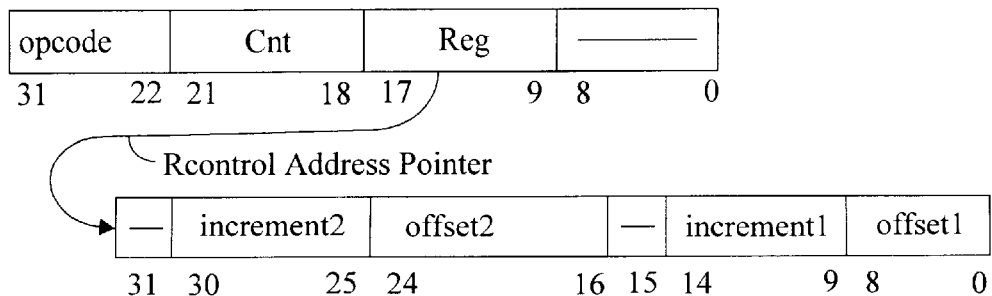
FIG. 3 illustrates the format of the move base pointer (MOVBP) instruction and the general operation instruction.

Referring now to FIGS. 1 and 3, a move base pointer (MOVBP) instruction and a general operation instruction are configured according to a predetermined format in the preferred embodiment. The central processor generates both the MOVBP instruction and the general operation instruction and delivers them along local bus 45 to the instruction decoder 60. The MOVBP instruction includes unused bits 0–8, control register (Rcontrol) address pointer bits 9–17, count (CNT) bits 18–21, and opcode bits 22–31. The Rcontrol address pointer, bits 9–17 of the MOVBP instruction, contains the address of a memory location holding a string of fields known collectively as Rcontrol. Therefore, the Rcontrol address pointer bits are provided to read port 80 from instruction decoder 60 when the MOVBP instruction is decoded. In response, read ports 80 supplies Rcontrol to the base pointers 300 and 400. Rcontrol includes four fields, referred to herein as the first offset value, the second offset value, the first increment value, and the second increment value. More specifically, the first offset value (Os1) is located in bits 0–8 of Rcontrol, the first increment value (Incr1) is placed in bits 9–14 of Rcontrol, bit 15 is unused, the second offset value (Os2) is located in bits 16–24 of Rcontrol, and the second increment value (Incr2) is located at bits 25–30 of Rcontrol. Bit 31 is unused. The opcode bits of the MOVBP instruction serve as a flag to the instruction decoder 60 of FIG. 1, alerting it that a general operation instruction will arrive on a subsequent clock cycle, as Rcontrol is supplied to read ports 80 or later. The CNT bits of the MOVBP instruction inform the control block 380 of FIG. 2 how many clock cycles the subsequent sequence of mathematical operations will occupy, except that in the preferred embodiment a CNT value of 15 is interpreted as an indefinite hold. The general operation instruction contains operand addresses, a destination address, and a mathematical operation field. As shown in FIG. 3, the general operation instruction reserves bits 0–8 for the destination address, bits 9–17 for an address to a first operand (e.g. $A_0$), bits 18–27 for an address to a second operand (e.g. $A_1$), and bits 28–31 for an operation code (e.g., logical operation, shift, addition, subtraction, multiplication, division) for the ALU 550.

Figure 4:
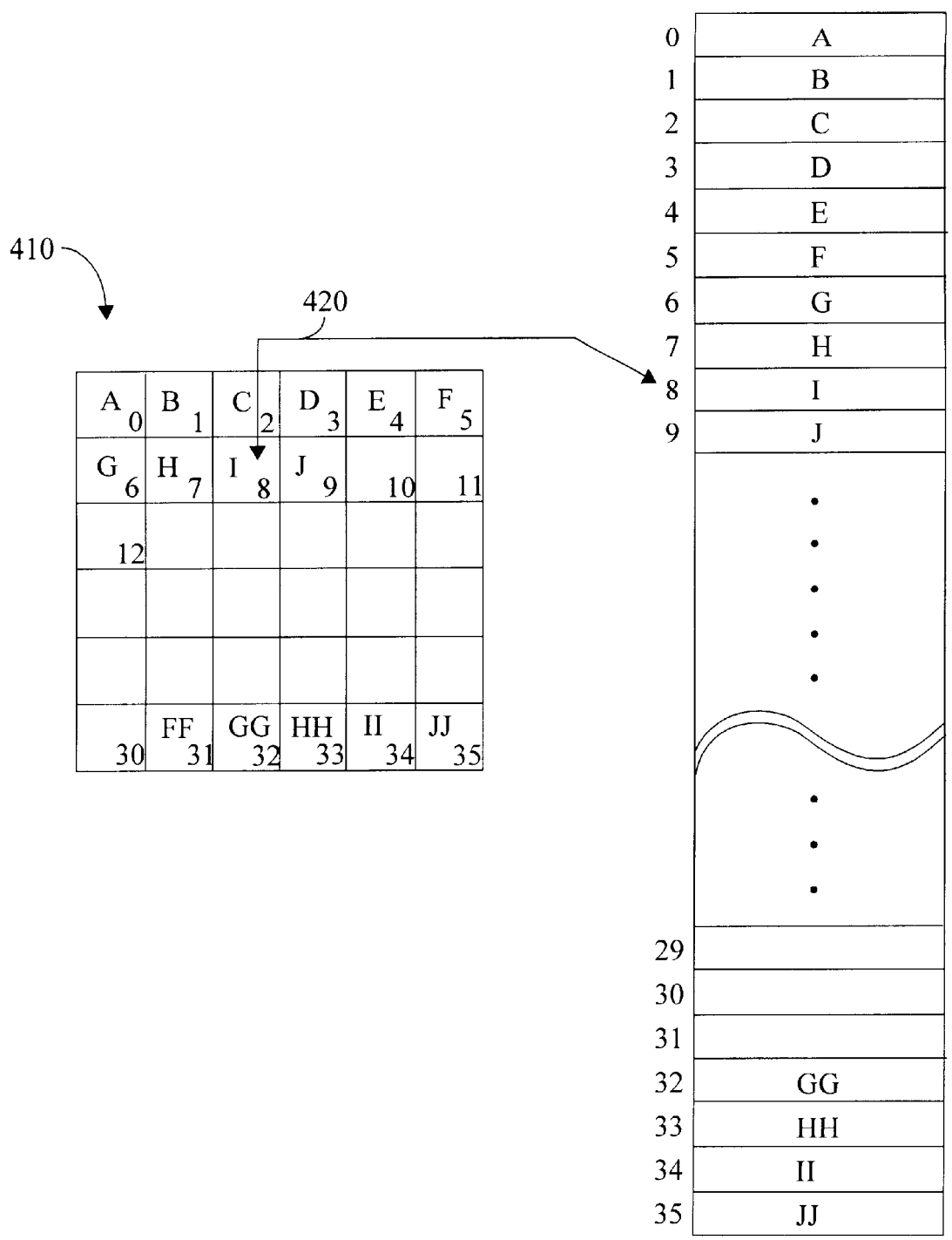
FIG. 4 depicts the organization of data in memory according to the preferred embodiment.

FIG. 4 shows the manner in which matrix data preferably is stored in memory. The data corresponding to a matrix preferably is stored in consecutive memory locations. For example, in a six-by-six array the first row of the matrix might be stored in memory location 0 through memory location 5. Row two would then be stored in memory locations 6 through 11. This allocation continues until the data corresponding to row six, column six is stored at memory location 35. The present invention utilizes two different register pointers for matrix multiplication. Where two different matrices are being multiplied, a first pointer corresponds to the first matrix and a second pointer corresponds to the second matrix. FIG. 4 illustrates one matrix 410, base pointer 420, and a string of registers in which operand values are stored. Base pointer 420 points at register 8 in memory, and at the corresponding location in a virtual matrix 410. As will be readily appreciated by one of ordinary skill, the value of base pointer 420 easily can be changed to indicate a different register in memory by changing the address to which it points.

Different mathematical operations place different demands on BP1 300 and BP2 400. For example, BP1 and BP2 each include an auto-increment feature. Under certain circumstances, this auto-increment feature is "on." Under certain other conditions, the auto-increment feature is "off." When the auto-increment feature of the preferred embodiment is "on," each base pointer is moved each cycle (i.e. a non-zero value is stored in the increment register of BP1 while MUX 340 is enabled such that the value held in offset register 360 changes every cycle by the increment value). Thus, the value transmitted by output lines 301, 401 is modified each clock cycle by an amount equal to Inc1 or Inc2, respectively. As best depicted in FIG. 4, the change in the outputs of BP1 and BP2 reflect the movement of the address pointers, one address pointer being shown in FIG. 4 and labeled as 420. Incr1 and Incr2 may be either positive or negative, but the preferred embodiment envisions a positive value for Incr1 and Incr2.

As will be appreciated by one of ordinary skill in the art, although the value provided by BP1 and BP2 changes every cycle, the value supplied by BP1, BP2 rarely reflects the effective address where an operand is found in a real-world computer or memory, even for a direct addressing scheme. Thus, to compute the first actual address where an operand is stored, the present invention adds the output of BP1 to the first operand address supplied by the general operation instruction. This sum (i.e., the value on output line 301 plus the value on output line 62) equals the value provided at the input terminal 82 of read port1 80. Likewise, the value of the second actual address is equal to the value at the input terminal 92 of read port2 90. In other words, for direct addressing, the output of adders 70 and 270 reflect the actual or effective addresses that hold the operands.

The speed and flexibility of the invention shown in FIGS. 1–4 can best be understood by examples of its operation. Each example details the activity each clock cycle in the relevant components. A first example shows how the present invention substantially speeds matrix multiplications. A second example shows how the present invention substantially speeds multiple adds. These examples are meant to be illustrative and not restrictive. The present invention can just as easily utilize different operations and is not limited to these specific mathematical operations.

The first example illustrates the substantial increase in speed the present invention produces for matrix multiplications and specifically details how the auto-increment feature of the present invention operates. This example assumes a matrix organized in consecutive memory locations as shown in FIG. 4 and further assumes that all base pointer registers begin cleared (i.e., set to zero) on the initial clock cycle, cycle 1. One of ordinary skill will appreciate that the entire MOVBP instruction can be provided to the set of latches 50. Alternately, only the destination address and the mathematical operation may be supplied to set of latches 50.

CYCLE 1: Referring now to FIG. 1, a MOVBP instruction is loaded into instruction decoder 60 on the initial cycle. Subsequently, but still during cycle 1, instruction decoder 60 provides bits 9–17 of the MOVBP instruction (the Rcontrol address pointer bits) to the input terminal 82 of read port1 80 through adder 70. Instruction decoder 60 supplies bits 18–21 of the MOVBP instruction, the CNT bits, to BP1 300 and BP2 400 on output lines 64 and 68, respectively.

CYCLE 2: On this cycle, the register file provides Rcontrol (i.e., Os1, Incr1, Os2, Incr2) at the output terminal 84 of read port1 80. Rcontrol is then latched into register 120.

CYCLE 3: On the next clock cycle, local bus 45 supplies a general operation instruction including a function code (e.g multiply) and two operand addresses (e.g, $A_0$, $A_1$) to the instruction decoder 60. Instruction decoder 60 then supplies the address $A_0$ to input terminal 82 of read port 80 and the address $A_1$ to input terminal 92 of read port2 90. If desired, a destination address may be provided to output line 69 of instruction decoder 60. However, it is not crucial that the destination address be provided on output line 69 on clock cycle 2. As will readily be understood by one of ordinary skill in the art, write port 100 merely requires that the destination address be present at its address input terminal 102 on the same cycle the data is present at the data input terminal 104 of the write port 100.

In addition, control logic 380 of BP1 (FIG. 2) and the corresponding control logic of BP2 load the CNT bits from the MOVBP instruction (FIG. 3).

CYCLE 4: On clock cycle 4, the first and second operands referenced by $A_0$ and $A_1$, respectively, are read from the register file. These operands will be referred to as $OPRND_0$ and $OPRND_1$. $OPRND_0$ appears at data output terminal 84 of read port1 80 and $OPRND_1$ appears at data output terminal 94 of read port2 90.

On the fourth cycle, if CNT is greater than zero, BP1 loads Os1 and Incr1 (from Rcontrol). BP2 correspondingly loads Os2 and Incr2. To clarify explanation, only the activities of BP1 will hereafter be described. However, as already explained, the same activities occur with respect to BP2 as with respect to BP1. More specifically, the Offset register 360 of BP1 loads Os1, while the Increment register 350 loads Incr1. Therefore, both the Os1value and the Incr1 value are provided to adder 370 via nine bit data bus 362 and six bit data bus 352, respectively. Output bus 390 of adder 370 electrically couples to an input terminal of MUX 340.

As can be readily understood by one of ordinary skill in the art, the output line 301 supplies the value stored in the Offset register 360. This first non-zero value on output line 301 will be referred to herein as $(Os1)_1$. Referring back to FIG. 1, $(Os1)_1$ (the output of BP1) and the address of $A_0$ are both provided to adder 70, which in turn provides $A_0+(Os1)_1$ to the input terminal 82 of read port1 80.

CYCLE 5: During clock cycle 5, $OPRND_0$ and $OPRND_1$ (corresponding to addresses $A_0$ and $A_1$) are loaded into registers 120 and 220, respectively, so that their values are present at lines 150 and 250. Thus, $OPRND_0$ and $OPRND_1$ appear at the inputs to ALU 550 and are operated upon (i.e. multiplied). In addition, the data stored at address location $A_0+(Os1)_1$ appears at the output terminal 84 of read port1 80. The corresponding data appears at output terminal 94.

Referring now to FIG. 2, Offset register 360 loads the value that was present on data bus 390 in cycle 3, namely $(Os1)_1+Incr1$. Correspondingly, the value supplied by output line 301 changes to reflect the new value stored in Offset register 360. This value will now be referred to as $(Os1)_2$.

Referring back to FIG. 1, adder 70 operates upon its new inputs, the address for $A_0$ (from instruction decoder 60) and $(Os1)_2$ (from output line 301) and provides the sum to the input terminal 82 of read port1 80. A corresponding sequence occurs at adder 270.

Referring now to FIG. 2, control 380 disables MUX 330, thereby not allowing any further change to the value held in increment register 350. Finally, adder 370 adds Incr1 to $(Os1)_2$ to yield $(Os1)_3$. This newly incremented value, $(Os1)_3$, does not yet appear at output line 301 but is present on data bus 390.

CYCLE 6: During cycle 6, the same steps occur as in cycle 5. That is, the data at memory location $A_0+(Os1)_2$ is read from the register file by read port1 80, which provides it to output terminal 84. ALU 550 operates on the operands corresponding to address locations $A_0+(Os1)_1$ and $A_1+(Os2)_1$. The output of BP1 changes to $(Os1)_3$. Consequently, adder 70 supplies $A_0+(Os1)_3$ to the input terminal 82 of read port1 80. In addition, Incr1 is added to $(Os1)_3$ by adder 370 yielding $(Os1)_4$. This newly incremented value, $(Os1)_4$, is present on line 390 in BP1 300.

CYCLE 7, 8 etc.: Repeat steps of cycle 5 until CNT equals zero.

Although not strictly necessary, cycle 6 is included in this disclosure to aid explanation. Starting on the fourth cycle, control 380 decreases CNT by one each cycle until CNT equals a predetermined number such as zero. When CNT equals the predetermined number, control 380 disables MUX 340, thereby not allowing the value on line 390 to cascade down to be loaded into Offset register 360. This action disables the auto-increment function. In the alternative, if CNT is initially equal to zero instead of some positive integer value (such as when only 2 numbers are to be multiplied), Os1, Incr1, Os2 and Incr2 are never loaded into BP1, BP2. Under either scenario, the value on output lines 301 and 401 stops changing. Therefore, new operand addresses are no longer being supplied to input terminals 82 and 92.

When the last operands have been operated upon by ALU 550, the accumulated value is written to a destination address by means of write port 100. Once CNT decrements to zero, all the registers in the present invention are cleared. This clearing allows immediate loading of a new MOVBP instruction followed by a new general operation instruction. The accumulate register of ALU 550 would not be cleared, however, until after the last set of operands from the previous MOVBP instruction has been operated upon. At that time, the accumulator in ALU 550 is reset to zero, to start fresh for two new operands.

Control circuitry, which may be located in instruction decoder 60 or at any other appropriate location as readily understood by one of ordinary skill in the art, delivers the destination address stored in set of latches 50 to write port 100 the cycle before a write is to be performed. As can be seen, there is a minimum of 3 cycles from the loading of the general operation instruction including destination addresses, and the initial write to the destination address. As can also be seen, on every cycle after clock cycle four the ALU 550 performs an operation.

Further, although it is not part of the preferred embodiment, the control circuitry may perform an unexpected task during cycle 2. Although the output terminal 84 of read port1 80 supplies Rcontrol to register 120 during cycle 2, control circuitry may also latch Rcontrol to the output line 150 of register 120 on the second cycle. By latching Rcontrol to the output line 150 of register 120, Rcontrol is immediately available as inputs to BP1 and BP2. This saves the one cycle required to allow Rcontrol to cascade from the output terminal 84 of read port1 80 through to the output line 150. Nonetheless, this feature is not preferred because it has been found that the increase in speed from this feature does not outweigh other considerations including the fact that other useful instructions may be executed during the "dead cycle," cycle 2.

The second example, below, explains how the present invention responds to multiple additions in quick succession. In this example, a MOVBP instruction is followed by three general operation instructions on consecutive cycles. Each of these general operation instructions includes an ADD as its mathematical operation and as well includes the addresses of two operands (e.g. $A_0$ and $A_1$, $A_2$ and $A_3$, $A_4$ and $A_5$). For multiple additions done in quick succession, Incr1 and Incr2 are set to zero. This is equivalent to having no auto-increment feature.

CYCLE 1: Referring now to FIG. 1, instruction decoder 60 loads a MOVBP instruction. Subsequently, but still during cycle 1, instruction decoder 60 provides bits 9–17 of the MOVBP instruction (the Rcontrol address pointer bits) to the input terminal 82 of read port1 80. Instruction decoder 60 also supplies bits 18–21 of the MOVBP instruction, the CNT bits, on output lines 64 and 68 to BP1 300 and BP2 400.

CYCLE 2: Read port1 supplies Rcontrol (i.e., Os1, Incr1, Os2, Incr2) from the register file (not shown) to its output terminal 84. Since this example depicts multiple additions, Incr1 and Incr2 both equal zero. Rcontrol is then latched into register 120.

CYCLE 3: On the next clock cycle, the instruction decoder 60 loads a general operation instruction including a mathematical operation (e.g. ADD) and two operand addresses (e.g., $A_0$, $A_1$). From there, the address $A_0$ is provided to input terminal 82 of read port 80 and the address $A_1$ is provided to input terminal 92 of read port2 90. The general operation instruction is also loaded into the set of latches 50. As explained above, the destination address should be supplied to the write port 100 on the same cycle as the data being stored. In addition, the mathematical operation should be supplied to the ALU 550 at the proper time so that the proper operation is used by ALU 550 when combining the operands present at its input terminals. Set of latches 50 operates as a 3-cycle pipeline, keeping the destination address and mathematical operation bits of a first general operation instruction available to the instruction decoder 60 for up to three cycles after a second general operation instruction has been loaded. Alternatively, instruction decoder 60 could record some storage location to keep old destination addresses and mathematical operations fresh. However, the information contained in the general operation instruction is envisioned as being stored in set of registers 50 until needed. Control circuitry (not explicitly shown) preferably controls the timing of the delivery of the relevant information to the ALU 550 and write port 100 on the proper cycles.

CYCLE 4: Instruction decoder 60 loads another general operation instruction. Set of laches 50 also loads this second general operation instruction. Instruction decoder 60 provides the input terminal 82 of read port1 80 another address for a different operand, for instance $A_2$. Input terminal 92 of read port2 90 is provided with yet another address for an operand, $A_3$.

Also during clock cycle 4, $OPRND_0$ and $OPRND_1$ appear at the output terminals 84, 94 of read ports 80, 90.

CYCLE 5: Instruction decoder 60 loads a third general operation instruction and provides the input terminal 82 of read port1 80 another operand address, $A_4$. Likewise, instruction decoder 60 supplies input terminal 92 of read port2 90 with another operand address, $A_5$. In addition, $OPRND_2$ and $OPRND_3$ appear at output terminals 84 and 94 respectively.

$OPRND_0$ and $OPRND_1$ are loaded into registers 120, 220 so that their values appear at output lines 150, 250. These two operands, $OPRND_0$ and $OPRND_1$ are then operated upon (i.e. added) at the ALU 550. Instruction decoder 60 provides the destination address corresponding to $OPRND_0$ and $OPRND_1$ to write port 100 via its output line 69.

CYCLE 6: The steps of cycle 6 are identical to those of cycle5, except that in addition the sum of $OPRND_0$ and $OPRND_1$ are stored from the accumulate register of ALU 550 to a destination address through write port 100. The accumulate register is then cleared.

The steps of cycle 6 are repeated until all of the ADDs have been completed and stored to the proper destination addresses. CNT is decreased by one each cycle by control 380. When CNT equals zero or some predetermined number, the last operands cascade through the present invention and are stored by write port 100. The relevant registers are also cleared.

Similar to the multiplication example above, in the instant multiple additions example Rcontrol may be latched to the output 150 of register 120 during clock cycle 2 as well as being provided at the output terminal 84 of read port1 80. By latching Rcontrol to the output 150 of register 120, the fields contained in Rcontrol are immediately available to BP1 and BP2. This feature, nonetheless, is not preferred.

The present invention is extremely fast. For a large number of operands, an average of almost one operation per cycle is achieved. This is a substantial gain in speed over the prior art. In addition, the present invention is extremely flexible. The matrix multiplication example assumes matrix data stored in consecutive address locations, or at least in some ordered fashion that can be reflected by an increment instruction. If indirect addressing were utilized so that what corresponds to $A_0$ in the matrix multiplication example is simply the effective address indicating where the desired operand is stored, the present invention could be adapted with little loss in speed. More specifically, desired data would return to the output terminal 84, 94 of read port1 or read port2, respectively, two cycles after the initial addresses were supplied to inputs 82, 92 (as opposed to one cycle). Therefore, as can be seen, indirect addressing (of one level) would slow execution by the present invention by only one clock cycle total, regardless of how many operands are being utilized. The present invention also is flexible in that it is not limited to matrices. Obviously, the same method as shown above could be utilized with other structures of operands. Moreover the present invention is not limited to multiplication. It is capable of processing any type of mathematical operation.

Although the present invention has been described with reference to preferred embodiments, workers skilled in the art will recognize that changes may be made in the form and detail without departing from the spirit and scope of the invention. For example, different functions can be employed for operation on the operands. Another base pointer block could be added to dynamically adjust the destination address instead of loading additional General Operation Instructions with different destination addresses under appropriate circumstances. The value stored in the accumulator may be operated upon further before or instead of being stored. Any value that is increased in the above examples may alternately be decreased and any value that is decreased may alternatively be increased. In addition, any operand address value that does not require being added to an offset value may be sent directly to the read ports thereby skipping adders 70, 270.

| | | | | |
|---|---|---|---|---|
| L0138 | | | ; | IDCT on COLUMNS |
| L0139 | a:86e0 | | dct_col. | |
| L0140 | a:86e0 | 0b1c0c00 | movbp | dct_bp 8 |
| L0141 | a:86e1 | 08c00000 | nop | |
| L0142 | | | ; | 8.0 (−128 . . . +127) 1.16 (−1.0 . . . +1.0) |
| L0143 | a:86e2 | 5b028008 | mul | dct.Ck.r0.c0 dct.pcos.n0.k0  8 0 |
| L0144 | a:86e3 | 5b069008 | mul | dct.Ck.r1.c0 dct.pcos.n0.k1  8 0 |
| L0145 | a:86e4 | 5b0aa008 | mul | dct.Ck.r2.c0 dct.pcos.n0.k2  8 0 |
| L0146 | a:86e5 | 5b0eb008 | mul | dct.Ck.r3.c0 dct.pcos.n0.k3  8 0 |
| L0147 | a:86e6 | 5b12c008 | mul | dct.Ck.r4.c0 dct.pcos.n0.k4  8 0 |
| L0148 | a:86e7 | 5b16d008 | mul | dct.Ck.r5.c0 dct.pcos.n0.k5  8 0 |
| L0149 | a:86e8 | 5b1ae008 | mul | dct.Ck.r6.c0 dct.pcos.n0.k6  8 0 |
| L0150 | a:86e9 | 5b1ef008 | mul | dct.Ck.r7.c0 dct.pcos.n0.k7  8 0 |
| L0151 | | | | |
| L0152 | a:86ea | 0b1c0c00 | movbp | dct_bp 8 |
| L0153 | a:86eb | 08c00000 | nop | |
| L0154 | a:86ec | 5b228088 | mul | dct.Ck.r0.c0 dct.pcos.n1.k0  8 1 |
| L0155 | a:86ed | 5b269088 | mul | dct.Ck.r1.c0 dct.pcos.n1.k1  8 1 |
| L0156 | a:86ee | 5b2aa088 | mul | dct.Ck.r2.c0 dct.pcos.n1.k2  8 1 |

-continued

| | | | | | | |
|---|---|---|---|---|---|---|
| L0157 | a:86ef | 5b2eb088 | mul | dct.Ck.r3.c0 dct.pcos.n1.k3 | 8 | 1 |
| L0158 | a:86f0 | 5b32c088 | mul | dct.Ck.r4.c0 dct.pcos.n1.k4 | 8 | 1 |
| L0159 | a:86f1 | 5b36d088 | mul | dct.Ck.r5.c0 dct.pcos.n1.k5 | 8 | 1 |
| L0160 | a:86f2 | 5b3ae088 | mul | dct.Ck.r6.c0 dct.pcos.n1.k6 | 8 | 1 |
| L0161 | a:86f3 | 5b3ef088 | mul | dct.Ck.r7.c0 dct.pcos.n1.k7 | 8 | 1 |
| L0162 | | | | | | |
| L0163 | a:86f4 | 0b1c0c00 | movbp | dct_bp 8 | | |
| L0164 | a:86f5 | 08900000 | astuff | 0 ; element 0, 11.8 (−1024 . . . + | | |
| L0165 | a:86f6 | 5b428108 | mul | dct.Ck.r0.c0 dct.pcos.n2.k0 | 8 | 2 |
| L0166 | a:86f7 | 5b469108 | mul | dct.Ck.r1.c0 dct.pcos.n2.k1 | 8 | 2 |
| L0167 | a:86f8 | 5b4aa108 | mul | dct.Ck.r2.c0 dct.pcos.n2.k2 | 8 | 2 |
| L0168 | a:86f9 | 5b4eb108 | mul | dct.Ck.r3.c0 dct.pcos.n2.k3 | 8 | 2 |
| L0169 | a:86fa | 5b52c108 | mul | dct.Ck.r4.c0 dct.pcos.n2.k4 | 8 | 2 |
| L0170 | a:86fb | 5b56d108 | mul | dct.Ck.r5.c0 dct.pcos.n2.k5 | 8 | 2 |
| L0171 | a:86fc | 5b5ae108 | mul | dct.Ck.r6.c0 dct.pcos.n2.k6 | 8 | 2 |
| L0172 | a:86fd | 5b5ef108 | mul | dct.Ck.r7.c0 dct.pcos.n2.k7 | 8 | 2 |
| L0173 | | | | | | |
| L0174 | a:86fe | 0b1c0c00 | movbp | dct_bp 8 | | |
| L0175 | a:86ff | 08900080 | astuff | 1 ; element 1, 11.8 (−1024 . . . + | | |
| L0176 | a:8700 | 5b628008 | mul | dct.Ck.r0.c0 dct.pcos.n3.k0 | 8 | 0 |
| L0177 | a:8701 | 5b669008 | mul | dct.Ck.r1.c0 dct.pcos.n3.k1 | 8 | 0 |
| L0178 | a:8702 | 5b6aa008 | mul | dct.Ck.r2.c0 dct.pcos.n3.k2 | 8 | 0 |
| L0179 | a:8703 | 5b6eb008 | mul | dct.Ck.r3.c0 dct.pcos.n3.k3 | 8 | 0 |
| L0180 | a:8704 | 5b72c008 | mul | dct.Ck.r4.c0 dct.pcos.n3.k4 | 8 | 0 |
| L0181 | a:8705 | 5b76d008 | mul | dct.Ck.r5.c0 dct.pcos.n3.k5 | 8 | 0 |
| L0182 | a:8706 | 5b7ae008 | mul | dct.Ck.r6.c0 dct.pcos.n3.k6 | 8 | 0 |
| L0183 | a:8707 | 5b7ef008 | mul | dct.Ck.r7.c0 dct.pcos.n3.k7 | 8 | 0 |
| L0184 | | | | | | |
| L0185 | a:8708 | 0b1c0c00 | movbp | dct_bp 8 | | |
| L0186 | a:8709 | 08900100 | astuff | 2 ; element 2, 11.8 (−1024 . . . + | | |
| L0187 | a:870a | 5b828088 | mul | dct.Ck.r0.c0 dct.pcos.n4.k0 | 8 | 1 |
| L0188 | a:870b | 5b869088 | mul | dct.Ck.r1.c0 dct.pcos.n4.k1 | 8 | 1 |
| L0189 | a:870c | 5b8aa088 | mul | dct.Ck.r2.c0 dct.pcos.n4.k2 | 8 | 1 |
| L0190 | a:870d | 5b8eb088 | mul | dct.Ck.r3.c0 dct.pcos.n4.k3 | 8 | 1 |
| L0191 | a:870e | 5b92c088 | mul | dct.Ck.r4.c0 dct.pcos.n4.k4 | 8 | 1 |
| L0192 | a:870f | 5b96d088 | mul | dct.Ck.r5.c0 dct.pcos.n4.k5 | 8 | 1 |
| L0193 | a:8710 | 5b9ae088 | mul | dct.Ck.r6.c0 dct.pcos.n4.k6 | 8 | 1 |
| L0194 | a:8711 | 5b9ef088 | mul | dct.Ck.r7.c0 dct.pcos.n4.k7 | 8 | 1 |
| L0195 | | | | | | |
| L0196 | a:8712 | 0b1c0c00 | movbp | dct_bp 8 | | |
| L0197 | a:8713 | 08900000 | astuff | 0 ; element 3, 11.8 (−1024 . . . + | | |
| L0198 | a:8714 | 5ba28108 | mul | dct.Ck.r0.c0 dct.pcos.n5.k0 | 8 | 2 |
| L0199 | a:8715 | 5ba69108 | mul | dct.Ck.r1.c0 dct.pcos.n5.k1 | 8 | 2 |
| L0200 | a:8716 | 5baaa108 | mul | dct.Ck.r2.c0 dct.pcos.n5.k2 | 8 | 2 |
| L0201 | a:8717 | 5baeb108 | mul | dct.Ck.r3.c0 dct.pcos.n5.k3 | 8 | 2 |
| L0202 | a:8718 | 5bb2c108 | mul | dct.Ck.r4.c0 dct.pcos.n5.k4 | 8 | 2 |
| L0203 | a:8719 | 5bb6d108 | mul | dct.Ck.r5.c0 dct.pcos.n5.k5 | 8 | 2 |
| L0204 | a:871a | 5bbae108 | mul | dct.Ck.r6.c0 dct.pcos.n5.k6 | 8 | 2 |
| L0205 | a:871b | 5bbef108 | mul | dct.Ck.r7.c0 dct.pcos.n5.k7 | 8 | 2 |
| L0206 | | | | | | |
| L0207 | a:871c | 0b1c0c00 | movbp | dct_bp 8 | | |
| L0208 | a:871d | 08900080 | astuff | 1 ; element 4, 11.8 (−1024 . . . + | | |
| L0209 | a:871e | 5bc28008 | mul | dct.Ck.r0.c0 dct.pcos.n6.k0 | 8 | 0 |
| L0210 | a:871f | 5bc69008 | mul | dct.Ck.r1.c0 dct.pcos.n6.k1 | 8 | 0 |
| L0211 | a:8720 | 5bcaa008 | mul | dct.Ck.r2.c0 dct.pcos.n6.k2 | 8 | 0 |
| L0212 | a:8721 | 5bceb008 | mul | dct.Ck.r3.c0 dct.pcos.n6.k3 | 8 | 0 |
| L0213 | a:8722 | 5bd2c008 | mul | dct.Ck.r4.c0 dct.pcos.n6.k4 | 8 | 0 |
| L0214 | a:8723 | 5bd6d008 | mul | dct.Ck.r5.c0 dct.pcos.n6.k5 | 8 | 0 |
| L0215 | a:8724 | 5bdae008 | mul | dct.Ck.r6.c0 dct.pcos.n6.k6 | 8 | 0 |
| L0216 | a:8725 | 5bdef008 | mul | dct.Ck.r7.c0 dct.pcos.n6.k7 | 8 | 0 |
| L0217 | | | | | | |
| L0218 | a:8726 | 0b1c0c00 | movbp | dct_bp 8 | | |
| L0219 | a:8727 | 08900100 | astuff | 2 ; element 5, 11.8 (−1024 . . . + | | |
| L0220 | a:8728 | 5be28088 | mul | dct.Ck.r0.c0 dct.pcos.n7.k0 | 8 | 1 |
| L0221 | a:8729 | 5be69088 | mul | dct.Ck.r1.c0 dct.pcos.n7.k1 | 8 | 1 |
| L0222 | a:872a | 5beaa088 | mul | dct.Ck.r2.c0 dct.pcos.n7.k2 | 8 | 1 |
| L0223 | a:872b | 5beeb088 | mul | dct.Ck.r3.c0 dct.pcos.n7.k3 | 8 | 1 |
| L0224 | a:872c | 08900000 | astuff | 0 ; element 6, 11.8 (−1024 . . . + | | |
| L0225 | a:872d | 5bf2c088 | mul | dct.Ck.r4.c0 dct.pcos.n7.k4 | 8 | 1 |
| L0226 | a:872e | 5bf6d088 | mul | dct.Ck.r5.c0 dct.pcos.n7.k5 | 8 | 1 |
| L0227 | a:872f | 5bfae088 | mul | dct.Ck.r6.c0 dct.pcos.n7.k6 | 8 | 1 |
| L0228 | a:8730 | 5bfef088 | mul | dct.Ck.r7.c0 dct.pcos.n7.k7 | 8 | 1 |
| L0229 | | | | | | |
| L0230 | a:8731 | 10200000 | ret | | | |
| L0231 | a:8732 | 08900080 | astuff | 1 ; element 7, 11.8 (−1024 . . . + | | |

What is claimed is:

1. Method for operating upon data located in memory address locations, comprising:

(a) Providing a MOVBP instruction, said MOVBP instruction providing a first increment value and a count value;

(b) Providing a general operation instruction including a first new operand address and a function instruction;

(c) Reading a first new operand from a memory location corresponding to said first new operand address;

(d) Adding a first offset value to said first new operand address value;

(e) Reading first data from a memory address location whose address value is equal to the sum of step (d), said sum comprising said first offset and said first new operand address value;

(f) Adding said first increment to said first offset such that said first offset equals said first offset plus said first increment;

(g) Altering count by a first predetermined value;

(h) Repeating from step (d) if count is not equal to a predetermined finish value and increment is not equal to zero; and (i) Providing a new general operation instruction including a new first operand and then repeating from step (d) if count is not equal to said predetermined finish value and increment is equal to zero.

2. The method of claim 1, wherein step (d) further comprises adding a second offset value to a second new operand address value.

3. The method of claim 1, wherein step (d) further comprises adding a second offset value to a second new operand address value.

4. The method of claim 3, wherein step (f) further comprises adding a second increment value to said second offset value such that said second offset equals said second offset plus said second increment value.

5. The method of claim 1, wherein said predetermined finish value is zero, said first increment value is a negative integer, and said count value begins as a positive integer.

6. The method of claim 1, wherein said method for operating upon data located in memory address locations is used to compress and decompress image data.

7. The method of claim 1, wherein said method for operating upon data located in memory address locations is used to compress and decompress image data.

8. The method of claim 1, wherein said MOVBP instruction includes an address location that contains said first increment value.

9. The method of claim 1, wherein said MOVBP instruction includes an address contains said count value.

10. An apparatus for executing mathematical functions, comprising:

an instruction decoder;

a first base pointer having an output, said first base pointer comprising an offset register and an increment register, said increment register connected to said offset register;

a read port for reading data from memory, said read port having an input and an output;

an adder with inputs from said instruction decoder and said base pointer, said adder including an output connected to said input of said read port; and a second base pointer having an output, said second base pointer comprising an offset register and an increment register, said increment register of said second base pointer connected to said offset register of said second base pointer, said output of said second base pointer providing an identical value to that stored in said offset register of said second base pointer.

11. The apparatus of claim 10, further comprising a pipeline connected to said instruction decoder, said pipeline storing information provided to said instruction decoder.

12. The apparatus of claim 10, further comprising a first latch connected to said output of said read port.

13. The apparatus of claim 10, wherein said first base pointer provides an output of an identical value to that stored in said offset register.

14. The apparatus of claim 10, wherein said increment register is configured to store a negative value.

15. The apparatus of claim 10, wherein said increment register is configured to store a positive value.

16. The apparatus of claim 10, wherein said output of said read port is connected to an arithmetic logic unit.

17. The apparatus of claim 10, further comprising:

a clock signal generator providing a clock signal, said clock signal including an increment cycle, wherein said output of said base pointer changes value each cycle of said clock signal after said increment cycle.

18. The apparatus of claim 17, wherein said output of said base pointer changes value by an amount equal to the value stored in said increment register.

* * * * *